United States Patent
Levy et al.

(10) Patent No.: US 7,346,776 B2
(45) Date of Patent: Mar. 18, 2008

(54) AUTHENTICATING MEDIA SIGNALS BY ADJUSTING FREQUENCY CHARACTERISTICS TO REFERENCE VALUES

(75) Inventors: Kenneth L. Levy, Stevenson, WA (US); Jun Tian, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 1463 days.

(21) Appl. No.: 09/731,456

(22) Filed: Dec. 6, 2000

(65) Prior Publication Data

US 2002/0031240 A1 Mar. 14, 2002

Related U.S. Application Data

(60) Provisional application No. 60/232,163, filed on Sep. 11, 2000.

(51) Int. Cl.
*H04L 9/00* (2006.01)
*G06K 9/00* (2006.01)

(52) U.S. Cl. .................. 713/176; 726/32; 358/3.28
(58) Field of Classification Search ................ 713/176, 713/179, 193; 380/4; 358/3.28; 726/32
See application file for complete search history.

(56) References Cited

U.S. PATENT DOCUMENTS

| | | | |
|---|---|---|---|
| 4,081,132 A | 3/1978 | Pearce | |
| 4,550,395 A | 10/1985 | Carlson | |
| 5,617,119 A | 4/1997 | Briggs et al. | |
| 5,636,292 A | 6/1997 | Rhoads | |
| 5,646,997 A | 7/1997 | Barton | |
| 5,721,788 A | 2/1998 | Powell et al. | |
| 5,745,604 A | 4/1998 | Rhoads | |
| 5,761,686 A | 6/1998 | Bloomberg | |
| 5,809,139 A | 9/1998 | Girod et al. | |
| 5,809,160 A | 9/1998 | Powell et al. | |
| 5,825,892 A | 10/1998 | Braudaway et al. | |
| 5,832,119 A * | 11/1998 | Rhoads ....................... | 382/232 |

(Continued)

FOREIGN PATENT DOCUMENTS

EP 0953938 11/1999

(Continued)

OTHER PUBLICATIONS

Stefan Katzenbeisser and Fabien A.P. Petitcolas, "Information hiding techniques for steganography and digital watermarking", ISBN: 1580530354.*

(Continued)

*Primary Examiner*—Kambiz Zand
*Assistant Examiner*—Peter Poltorak

(57) ABSTRACT

A method of authenticating a media signal and related software, systems and applications. The method transforms at least a portion of the media signal into a set of frequency coefficients in a frequency domain. For example, it applies a Fast Fourier Transform (FFT) or other frequency transform to blocks of a media signal, such as an image, audio or video signal. It adjusts a relationship between selected frequency coefficients to a reference value. This adjustment is selected so that an alteration to be detected, such as a re-sampling operation or digital to analog—analog to digital conversion, alters the relationship. To detect the alteration, a detector computes the relationship in a potentially corrupted version of the signal. It then compares the result with a threshold value to detect whether the alteration has occurred.

20 Claims, 1 Drawing Sheet

U.S. PATENT DOCUMENTS

| | | | |
|---|---|---|---|
| 5,835,639 | A | 11/1998 | Honsinger et al. |
| 5,841,886 | A | 11/1998 | Rhoads |
| 5,859,920 | A * | 1/1999 | Daly et al. .................. 382/115 |
| 5,862,260 | A | 1/1999 | Rhoads |
| 5,875,249 | A | 2/1999 | Mintzer et al. |
| 5,915,027 | A | 6/1999 | Cox et al. |
| 5,915,044 | A | 6/1999 | Gardos et al. |
| 5,930,377 | A | 7/1999 | Powell et al. |
| 5,933,798 | A | 8/1999 | Linnartz |
| 5,974,548 | A | 10/1999 | Adams |
| 6,026,193 | A | 2/2000 | Rhoads |
| 6,064,764 | A | 5/2000 | Bhaskaran et al. |
| 6,065,119 | A | 5/2000 | Sandford, II et al. |
| 6,122,403 | A | 9/2000 | Rhoads |
| 6,240,121 | B1 | 5/2001 | Senoh |
| 6,246,777 | B1 | 6/2001 | Agarwal et al. |
| 6,272,176 | B1 | 8/2001 | Srinivasan |
| 6,275,599 | B1 | 8/2001 | Adler et al. |
| 6,285,775 | B1 | 9/2001 | Wu et al. |
| 6,332,030 | B1 | 12/2001 | Manjunath et al. |
| 6,332,031 | B1 | 12/2001 | Rhoads et al. |
| 6,532,541 | B1 * | 3/2003 | Chang et al. ................ 713/176 |
| 6,535,251 | B1 * | 3/2003 | Ribas-Corbera ....... 375/240.03 |
| 6,563,935 | B1 * | 5/2003 | Echizen et al. ............. 382/100 |
| 6,625,295 | B1 * | 9/2003 | Wolfgang et al. ........... 382/100 |
| 6,757,407 | B2 * | 6/2004 | Bruckstein et al. ......... 382/100 |
| 6,785,815 | B1 | 8/2004 | Serret-Avila et al. |
| 6,834,344 | B1 | 12/2004 | Aggarwal |
| 2001/0024510 | A1 | 9/2001 | Iwamura |
| 2002/0009208 | A1 | 1/2002 | Alattar et al. |
| 2002/0076082 | A1 | 6/2002 | Arimura et al. |
| 2002/0095577 | A1 | 7/2002 | Nakamura et al. |
| 2002/0114456 | A1 | 8/2002 | Sako |

FOREIGN PATENT DOCUMENTS

| | | |
|---|---|---|
| EP | 1041815 | 4/2000 |
| WO | WO00/33282 | 6/2000 |
| WO | WO00/75925 | 12/2000 |

OTHER PUBLICATIONS

Fridrich (Jiri Fridrich, "Combining low-frequency and spread spectrum watermarking", Proc. SPIE Int. Symposium on Optical Science, Engineering, and Instrumentations, San Diego, Jul. 1998).*

Tsekeridou et al. (S. Tsekeridou and I. Pitas, Wavelet-based self-similar watermarking for still images, ISCAS 2000, IEEE, May 2000).*

Fridrich2 (Jiri Fridrich, "Image Watermarking for tamper detection").*

Zhu (Wenwu Zhu, Zixiang Xiong and Ya-Qin Zhang "Multiresolution Watermarking for Images and Video", IEEE Transactions on circuits and systems for video technology, vol. 9, No. 4, Jun. 1999).*

Kundur et al. (Deepa Kundur and Dimitrios Hatzinakos, "Digital Watermarking for telltale tamper proofing and authentications", proceedings of the IEEE, vol. 87, No. 7, Jul. 1999).*

Matsui et al., "Video-Steganography: How to Secretly Embed a Signature in a Picture", IMA Intellectual Property Project Proceedings, vol. 1 Issue 1, Jan. 1994, pp. 187-204.

Swanson et al., "Robust Data Hiding for Images", IEEE Digital Signal Processing Workshop Proceedings, Sep. 1-4, 1996, pp. 37-40.

Zhu et al., "Transparent Robust Authentication and Distortion Measurement Techniques for Images", IEEE 1996, pp. 45-48.

O'Ruanaidh et al., "Rotation, Scale and Translation Invariant Digital Image Watermarking", International Conference on Image Processing, vol. I of III, IEEE Signal Processing Society, Oct. 26-29, 1997, pp. 536-539.

Yeung et al., "Digital Watermarks: Shedding Light on the Invisible", IEEE 1998, pp. 32-41.

Yeung et al., "An Invisible Watermarking Technique for Image Verification", International Conference on Image Processing, vol. I of III, IEEE Signal Processing Society, Oct. 26-29, 1997, pp. 680-683.

Zhao et al., "Embedding Robust Labels into Images for Copyright Protection", Proc. Of the International Congress on Intellectual Property Rights for Specialized Information, Knowledge and New Technologies (Vienna, Austria, Aug. 21-25, 1995), 10 pages.

Koch et al., "Digital Copyright Labeling: Providing Evidence of Mis-use and Tracking Unauthorized Distribution of Materials", OASIS Magazine, Dec. 1995, 3 pages.

Koch et al., "Towards Robust and Hidden Image Copyright Labeling", Proc. Of 1995 IEEE Workshop on Nonlinear signal and Image Processing (Neos Marmaras, Greece, Jun. 20-22, 1995), 4 pages.

U.S. Appl. No. 60/180,364, filed Feb. 4, 2000, Davis et al.

U.S. Appl. No. 60/198,138, filed Apr. 17, 2000, Alattar.

U.S. Appl. No. 60/198,857, filed Apr. 21, 2000, Davis et al.

U.S. Appl. No. 09/198,022, filed Nov. 23, 1998, Rhoads.

U.S. Appl. No. 09/525,865, filed Mar. 15, 2000, Davis et al.

U.S. Appl. No. 09/618,948, filed Jul. 19, 2000, Sharma et al.

U.S. Appl. No. 09/625,577, filed Jul. 25, 2000, Carr et al.

U.S. Appl. No. 09/645,779, filed Aug. 24, 2000, Tian et al.

U.S. Appl. No. 09/689,250, filed Oct. 11, 2000, Ahmed.

Szepanski, W., "A Signal Theoretic Method for Creating Forgery-Proof Documents for Automatic Verification," IEEE Proc. 1979 Carnahan Conf. con Crime Countermeasures, May 1979, pp. 101-109.

Matthews, R., "When Seeing is not Believing," New Scientist, No. 1895, Oct. 16, 1993, pp. 13-15.

Friedman, G.L., "The Trustworthy Digital Camera: Restoring Credibility to the Photographic Image," IEEE Trans. Consumer Electronics, , vol. 39, No. 4, Nov. 1993, pp. 905-910.

Walton, S., "Image Authentication for a Slippery New Age," Dr. Dobb's Journal, Apr. 1995, pp. 18-20, 22-24, 26, 82 and 84-87.

Schneider, Mr., "A Robust Content Based Digital Signature for Image Authentication," IEEE Proc. Int. Conf. on Image Processing, Sep. 1996, pp. 227-230 (vol. 3).

Lin, C.-Y. et al., "Generating Robust Digital Signature for Image/Video Authentication," Proc. Multimedia and Security Workshop at ACM Multimedia'98, Sep. 1998, pp. 49-54.

Dittmann, J., "Chapter 3: Telltale Watermarking," in Multiresolution Digital Watermarking: Algorithms and Implications for Multimedia Signals, Ph.D. thesis at Univ. of Toronto, 1999, pp. 23-52.

Lin, C.-Y. et al., "Issues and Solutions for Authenticating MPEG Video," Proc. SPIE vol. 3657: Security and Watermarking of Multimedia Contents, Jan. 1999, pp. 54-65.

Xie, L. et al., "Secure MPEG Video Communications by Watermarking," Proc. Conf. of ATIRP (Advanced Telecommunications and Information Distributions Research Project), Feb. 199, pp. 459-462.

Dittmann, J. et al., "Content-Based Digital Signature for Motion Pictures Authentication and Content-Fragile Watermarking," IEEE Proc. Int. Conf. on Multimedia Computing and Systems, Jun. 1999, pp. 209-213.

Lamy, P. et al., "Content-Based Watermarking for Image Authentication," Proc. 3rd Int. Workshop on Information Hiding, Sep./Oct. 1999, pp. 187-198.

Queluz, M.P. et al., "Spatial Watermark for Image Verification," Proc. SPIE vol. 3971: Security and Watermarking of Multimedia Contents II, Jan. 2000, pp. 120-130.

Sun, Q. et al., "VQ-Based Digital Signature Scheme for Multimedia Content Authentication," Proc. SPIE vol. 3971: Security and Watermarking of Multimedia Contents II, Jan. 2000, pp. 404-416.

Xie, L. et al. "Methods for Soft Image/Video Authentication," Proc. Conf. of ATIRP (Advanced Telecommunications and Information Distribution Research Project), Mar. 2000, 5 pages.

Rey, C. et al., "Blind Detection of Malicious Alterations on Still Images Using Robust Watermarks," Proc. II Seminar on Secure Images and Image Authentication, Apr. 2000, pp. 7/1-7/6.

Bassali et al., "Compression Tolerant Watermarking for Image Verification," IBM India Research Lab, date unknown, 4 pages.

Frequently Asked Questions, EPSON Image Authentication System (IAS), Oct. 5, 1999, 3 pages.

Chae et al. "A Robust Embedded Data from Wavelet Coefficients", Department of Electrical and Computer Engineering, University of California.

Cooklev et al., "A Multiresolution Technique for Watermarking Digital Images", ICCE, Jun. 11-13, 1997, pp. 354-355.

Dugad et al., "A New Wavelet-Based Scheme for Watermarking Images", IEEE Oct. 4-7, 1998, pp. 419-423.

Hsu et al., "Multiresolution Watermarking for Digital Images", IEEE, vol. 45, No. 8, pp. 1097-1101, Aug. 1998.

Inoue et al., "A digital Watermark Methods Using the Wavelet Transform for Video Data", IEICE Trans. Fundamentals, vol. E83-A, No. 1, Jan. 2000, pp. 96.

Kim et al., "A Robust Wavelet-Based Digital Watermarking Using Level-Adaptive Thresholding", IEEE 1999, pp. 226-230.

Kim et al., "Wavelet Based Watermarking method for Digital Images Using the Human Visual System", IEEE 1999, pp. 80-83.

Kundur et al., "A Robust Digital Image Watermarking Method Using Wavelet-Based Fusion", Int. Conf. On Image Proc., Oct. 1997, pp. 544-547.

Kundur et al., "Digital Watermarking for Telltale Tamper Proofing and Authentication", IEEE, vol. 87, No. 7, pp. 1167-1180.

Kundur et al., "Digital Watermarking Using Multiresolution Wavelet Decomposition", IEEE, ICASSP '98, pp. 2969-2972, vol. 5.

Matsui et al., "Embedding a Signature to Pictures Under Wavelet Transformation", *Transaction of the Institute of Electronics Information and Communication Engineers D-11*, vol. J79D-11, No. 6, Jun. 1996, pp. 1017-1024.

Matsui et al., "Use of the Wavelet Transformation to Embed Signatures in Images", Systems and Computers in Japan, Jan. 1997, vol. 28, No. 1, pp. 87-94.

Meerwald et al., "A Survey of Wavelet-domain Watermarking Algorithms", *Security and Watermarking of Multimedia Contents III*, Jan. 2001, vol. 4314, pp. 505-516.

Onishi et al., "A Method of Watermarking with Multiresolution Analysis and Pseudo Noise Sequences", Systems and Computers in Japan, vol. 29, No. 5, pp. 11-19, May 1998.

Ohnishi et al., Embedding a Seal into a Picture Under Orthogonal Wavelet Transform, Proceedings of MULTIMEDIA '96, IEEE, pp. 514-521.

Swanson et al., "Multiresolution Scene-Based Video Watermarking Using perceptual Models", IEEE, May 1998, vol. 16, No. 4, pp. 540-550.

Tsekeridou et al., "Embedding self-similar watermarks in the wavelet domain", IEEE, ICASSP 2000, pp. 1967-1970.

Tsekeridou et al., "Wavelet-based self-similar watermarking for still images", 2000 IEEE International Symposium on Circuits and Systems, pp. 220-223.

Wang et al., "Wavelet Based Digital Image Watermarking", Optics Express, vol. 3, No. 12, pp. 491-496, Dec. 7, 1998.

Wei et al., "Perceptual Digital Watermark of Images Using Wavelet Transform", IEEE Transactions on Consumer Electronics, vol. 44, No. 4, pp. 1267-1272, Nov. 1998.

Xie et al., Joint Wavelet Compression and Authentication Watermarking, ICIP, Oct. 4-7, 1998, pp. 427-431.

Zhu et al., "Multiresolution Watermarking for Images and Video", IEEE Transactions on Circuits and Systems for Video Technology, vol. 9, No. 4, Jun. 1999, pp. 545-550.

Cox, "A Secure, Imperceptible yet Perceptually Salient, Spread Spectrum Watermark for Multimedia", Southcon Jun. 1996, pp. 192-197.

Hsu, "DCT-Based Watermarking for Video", IEEE 1998, pp. 206-216.

* cited by examiner

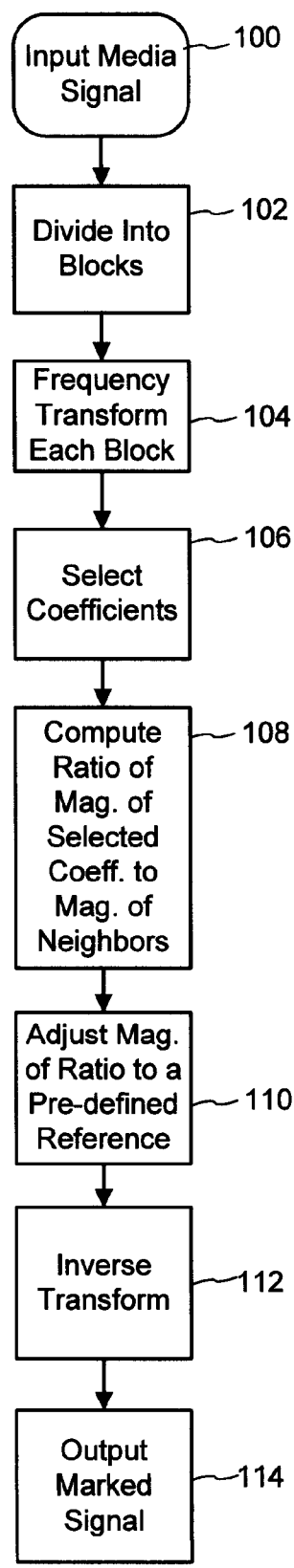
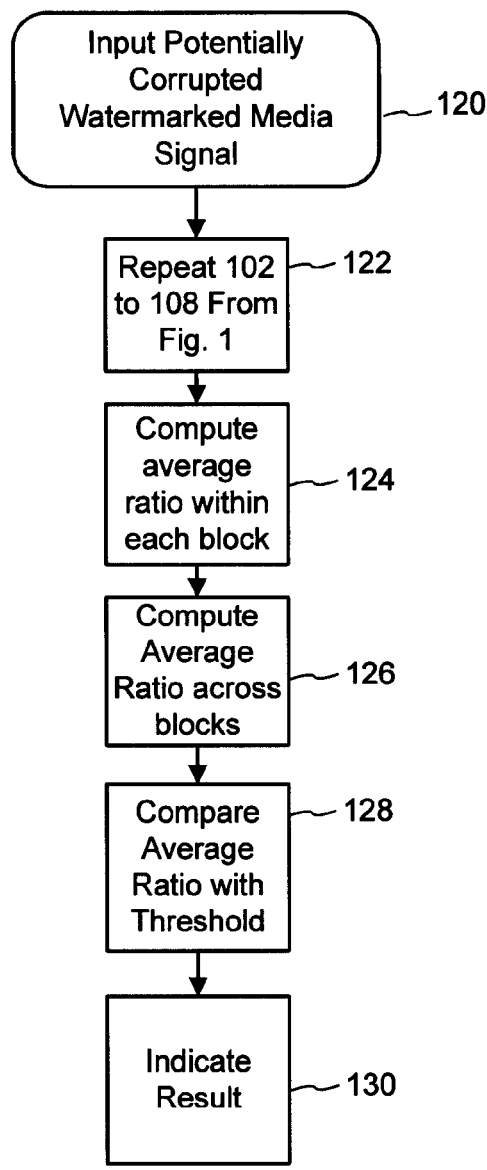

AUTHENTICATING MEDIA SIGNALS BY ADJUSTING FREQUENCY CHARACTERISTICS TO REFERENCE VALUES

RELATED APPLICATION DATA

This patent application claims the benefit of U.S. Provisional Application 60/232,163 filed Sep. 11, 2000, which is hereby incorporated by reference.

TECHNICAL FIELD

The invention relates to steganography, data hiding, and authentication of media signals, such as images and audio signals.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literal tire in this field. Particular techniques for embedding and detecting imperceptible watermarks in media signals are detailed in the assignee's co-pending application Ser. No. 09/503,881 (Now U.S. Pat. No. 6,614,914) and U.S. Pat. No. 5,862,260, which are hereby incorporated by reference. Examples of other watermarking techniques are described in U.S. patent application Ser. No. 09/404,292, which is hereby incorporated by reference. Additional features of watermarks relating to authentication of media signals and fragile watermarks are described in U.S. patent application 60/198,138, Ser. No. 09/498,223 (Now U.S. Pat. No. 6,574,350), Ser. No. 09/433,104 (Now U.S. Pat. No. 6,636,615), and 60/232,163, which are hereby incorporated by reference.

The invention provides a method of authenticating a media signal and related software, systems and applications. The method transforms at least a portion of the media signal into a set of frequency coefficients in a frequency domain. For example, it applies a Fast Fourier Transform (FFT) or other frequency transform to blocks of a media signal, such as an image, audio or video signal. It adjusts a relationship between selected frequency coefficients to a reference value. This adjustment is selected so that an alteration to be detected, such as a re-sampling operation or digital to analog—analog to digital conversion, alters the relationship. To detect the alteration, a detector computes the relationship in a potentially corrupted version of the signal. It then compares the result with a threshold value to detect whether the alteration has occurred.

A further aspect of the invention is a method of authenticating a media signal. The method evaluates signal peaks at selected frequency coefficients of the media signal. In a prior embedding process, the media signal has been modified to include peaks at the selected frequencies, such as by the technique summarized in the previous paragraph. The method determines, based on degradation of the signal peaks, whether the media signal has been altered. The frequency location of the peaks may vary from one application to the next. To detect, scanning and printing of watermarked images for example, the peaks are located at higher frequencies.

Another aspect of the invention is a watermark decoder, which includes a detector and analyzer for determining alteration of a watermarked media signal. The detector correlates a calibration signal with a media signal suspected of carrying a watermark to determine orientation parameters describing orientation of the media signal at embedding of the watermark. The calibration signal includes a set of peaks at selected frequency coefficients. The analyzer orients the media signal using the orientation parameters and evaluates whether the media signal has been altered by examining signal peaks at selected frequency coefficients in the media signal.

Further features will become apparent with reference to the following detailed description and accompanying drawings. The following description details a method for detecting whether an image has been scanned, printed or photocopied after being processed by the method. It also describes alternative implementations and applications.

BRIEF DESCRIPTION OF THE DRAWINGS

FIG. 1 is a flow diagram illustrating a process of embedding an authentication watermark in a media signal.

FIG. 2 is a flow diagram illustrating a process of detecting the authentication watermark from a potentially corrupted version of the watermarked signal.

DETAILED DESCRIPTION

FIG. 1 is a flow diagram illustrating a process of embedding an authentication watermark in an input media signal (100), and in particular, in an image. The embedder begins by dividing a grayscale image into N×N blocks of samples at a specified resolution (102), where N is a pre-defined integer. For each block, the embedder computes a frequency transform of the image samples in that block (104), namely, a fast Fourier transform. From the mid-frequency and mid-high frequency coefficients, the embedder selects M Fourier transform coefficients (106), where M is a pre-defined integer. The coefficient locations are fixed by a pre-defined pattern. For example, the locations are scattered among roughly 25 to 100 coefficient locations in the mid to mid-high frequency range of a Fourier transform domain of a block of image samples where N ranges from 64 to 512 at spatial resolutions ranging from 75 to 600 dots per inch (DPI). The locations are symmetric about vertical and horizontal axes (and potentially diagonal axes) to facilitate detection as explained further below.

For each of the M selected coefficients, x, the embedder computes a ratio of the magnitude of a selected coefficient relative to the magnitude of its neighbors (108). In particular, it is a ratio of the magnitude of the selected coefficient to the average magnitude of the surrounding neighbors:

$r(x)$=Magnitude_of_$x$/Average_of_Magnitude_of_Eight_Neighbors_of_$x$

If $r(x)<r$, where r is a pre-defined reference value, the embedder increases the magnitude of x such that:

$r(x)=r$(Block 110).

In this implementation, the value of r is a pre-defined constant. The reference may be derived dynamically from the input media signal. Also, the reference may be selected from a table of values so as to select the value of r in the table at the minimum distance from $r(x)$. The adjustment to the host image is selected so as to be imperceptible or substantially imperceptible to a user in an output form of the watermarked signal.

Next, the embedder computes the inverse fast Fourier transform on each block to obtain the watermarked grayscale image (112). The watermarked image (114) may then undergo one or more transformations, such as digital to analog conversion, printing, scanning, analog to digital conversion, photocopying, etc. These transformations tend to corrupt the watermarked image in a predictable way.

The watermarking process of FIG. 1 may be combined with another watermarking process to embed other watermarks, either robust or fragile to transformations such as sampling distortions, geometric distortions, scaling, rotation, cropping, etc. In particular, the process may be combined with an embedding process described in pending application Ser. No. 09/503,881 (Now U.S. Pat. No. 6,614,914) or U.S. Pat. No. 5,862,260 to encode a calibration signal that enables a detector to compensate for distortions such as scaling, rotation, translation, differential scale, shear, etc. In one implementation, for example, the calibration signal comprises an array of impulse or delta functions scattered in a pattern in the Fourier domain of each block of image samples. To embed the pattern, the embedder perceptually adapts the calibration signal to the host image block and adds it to that block. The impulse functions of the calibration signal have a pre-destined magnitude and pseudo-random phase. To make the calibration signal less perceptible yet detectable, the embedder modulates the energy of the calibration signal according to the data hiding attributes (e.g., local contrast) of the image samples to which it is added. Preferably, the locations of the impulse functions are scattered across a range of frequencies to make them robust to transformations like spatial scaling, rotation, scanning, printing, and lossy compression. Further, they are preferably arranged to be symmetric about vertical anti horizontal axes in the Fourier domain to facilitate detection after flipping or rotating the watermarked image.

The frequency coefficient locations selected for the method illustrated in FIG. 1 may be mutually exclusive or overlap the coefficient locations of the calibration signal. The calibration signal preferably has impulse functions at lower frequencies to survive compression, scanning, printing, etc. while the pattern of coefficients employed in FIG. 1 includes coefficients at locations that are likely to be impacted by alterations to be detected, such as printing, scanning and photocopying. In the case where they overlap, the modification of the coefficients according to FIG. 1 is implemented so as not to interfere with the calibrations signal. In particular, the embedder adjusts the selected coefficients as shown in FIG. 1 after the impulse functions of the calibration signal have been introduced, or the embedder calculates the watermarked signal taking into account the changes of the coefficient values due to the calibration signal and the process of FIG. 1.

Another approach is to adjust the selected frequency coefficients in the method of FIG. 1 so that those coefficients act as both a calibration signal and an authentication signal. The locations of the coefficients for the method of FIG. 1 and the delta functions of the calibration signal are the same. The embedder increases the magnitudes of selected mid to mid-high frequency coefficients relative to their neighbors to achieve the desired relationship with neighboring coefficients for authentication purposes. Since this modulation includes the addition of a delta function to the selected coefficients, it also inherently embeds a calibration signal comprised of delta functions at the selected locations. To compensate for rotation and scale, the detector performs a Fourier Mellin transform of the suspect signal and the calibration signal into a log-polar space and then correlates the two signals. The location of the correlation peak in log polar space provides the spatial scale and rotation parameters. These parameters may then be used to compensate for rotation and scale changes before performing additional watermark decoding operations, such as the authentication operations of FIG. 2.

To compute translation, the delta functions added to the selected coefficients may be given a known pseudorandom phase. In this case, the detector correlates the phase information of the calibration signal with the suspect signal after compensating for rotation and scale. The location of the correlation peak gives the translation offset in the horizontal and vertical directions.

In addition to being integrated with other watermark signal components, the process of FIG. 1 may be combined with a robust watermark embedding process to carry a multi-bit message payload carrying metadata or a link to metadata stored in an external database. Example implementations for embedding this type of robust watermark are described in pending application Ser. No. 09/503,881 (Now U.S. Pat. No. 6,614,914) and U.S. Pat. No. 5,862,260.

FIG. 2 is a flow diagram illustrating a process of detecting the authentication watermark from a potentially corrupted version of the watermarked media signal (120) from the process of FIG. 1. The first four steps (122) are the same as shown in the embedder. For each block, the detector computes the average of $r(x)$, where x is over all M selected coefficients (124), R=Average_of_$r(x)$ The detector computes the average of R over all blocks (126), AR=Average_of_R To detect whether the watermarked signal has undergone alterations, the detector compares the average of R with a pre-defined threshold (128). If AR>=T, where T is a pre-defined threshold, then the detector classifies it as original. If AR<T, then the detector classifies it as a copy. Depending on the application, the detector may indicate the result (130) to a user through some user interface (e.g., visual display, audio output such as text to speech synthesis, etc.). The detector may also indicate the result (130) to another software process or device to take further action, such as communicating the event to a another device or database for logging, recording tracer data about the user or device in which the alteration is detected, linking the detecting device to a network resource such as a web site at a specified URL that informs the user about usage rules, licensing opportunities, etc.

To make the process robust to geometric distortion, the detector includes a pre-processing phase in which it correlates a calibration signal with the potentially corrupted watermarked signal as described in pending application Ser. No. 09/503,881 (Now U.S. Pat. No. 6,614,914) or U.S. Pat. No. 5,862,260. Using a Fourier Mellin transform, the detector maps both the calibration signal and the received signal into a log polar coordinate space and correlates the signals (e.g., using generalized matched filters) to calculate estimates of rotation and scale. After compensating for rotation and scale, the detector uses the phase information of the calibration signal to compute translation, e.g., the origin or reference point for each block. Further correlation operations may be used to compute differential scale (e.g., the change in scale in the horizontal and vertical directions after watermarking). After compensating for geometric distortion, the detector executes the process of FIG. 2 to detect alteration in the selected frequency coefficients modified according to the method shown in FIG. 1.

While the invention is illustrated with respect to a specific implementation, it may be implemented in a variety of alternative ways. For example, the above example specifically refers to a grayscale image. This example may be adapted to other types of images including video and still imagery, color and monochrome images, etc. For color images, the embedding and detecting operations may be performed on two or more color channels, including luminance, chrominance or some other color channels. The embedding and detecting operations may be applied to frequency coefficients of alternative frequency transforms, such as DCT and wavelet, to name a few.

The embedding process shown in FIG. 1 may be performed on a portion of the host signal to create a watermark signal that is combined with the host signal. For example, in one possible implementation, the embedder pre-filters the host signal to yield a high pass filtered signal including content at the mid and high frequency ranges impacted by the watermark. The embedder makes the modification to this filtered signal, and then combines the resulting modified signal with the original signal.

The embedding and detecting processes may also be integrated into compression and decompression operations. For example, the frequency domain transform may be executed as part of a compression process, such as JPEG, JPEG 2000 or MPEG, where blocks of the signal are transformed into a frequency domain. Once converted to the frequency domain, frequency coefficients may be adjusted as described above.

The embedding and detecting operations apply to other media types, including audio media signals. In addition, the frequency domain coefficients may be selected and adjusted to reference values to detect other types of signal alteration, such as lossy compression, digital to analog and analog to digital conversion, downsampling and upsampling, etc.

Semi-fragile Watermarks

A related watermarking approach is to use an array of Fourier magnitude impulse functions with random phase (a calibration signal, also referred to as a watermark synchronization or orientation signal) for semi-fragile, and copy and copy-attack resistant watermarks. Semi-fragile refers to a watermark that degrades in response to some types of degradation of the watermarked signal but not others. In particular for document authentication applications using such a watermark, the watermark decoder can determine if the watermark has been scanned and printed or battered by normal usage, potentially while being read with a web camera. The copy-attack relates to the assertion that one can use noise-reduction, i.e. Wiener filters, to lift a watermark and, then using threshold and masking techniques, one can re-embed it in a new image. Interestingly, these concepts are related because they both include an additional scanning and printing cycle, assuming the copy attack works on printed, not only digital, content. This type of semi-fragile watermark can be used to determine if a watermarked document has been copied, possibly using a high quality copier and low quality reader, and as such, can stop copying and can be used to measure quality of service.

One approach to implementing a semi-fragile watermark is to embed extra signal peaks in the Fourier magnitude domain that are of varying intensity, and have the watermark decoder determine if the watermark has been scanned and printed by the relative power of the extra and original calibration signal peaks. The extra peaks refer to a set of peaks used to implement the semifragile watermark. The original calibration signal peaks refer to the ones already included in the watermark to determine its orientation in a geometrically distorted version of the watermarked signal. For an example of such a calibration signal, see U.S. Pat. No. 5,862,260 and U.S. application Ser. No. 09/503,881 (Now U.S. Pat. No. 6,614,914), which are incorporated by reference. Some peaks are referred to as "extra" because they are included in addition to other peaks that form the original set of peaks in a calibration signal.

One advantage of including the semi-fragile watermark in the calibration signal is that the robust part of the watermark, which includes the desired detailed information such as a unique ID, is the multi-bit message, whereas the fragile part, which is only used to determine copying, is a few bit message. The fragile watermark can be considered as a single bit (copied or not) but actually allows more information by being frequency specific, as described below. Interestingly and potentially advantageously, the semi-fragile watermark is separate but inherently related to the robust watermark—thus they cannot be separated for successful copy attacks.

Specifically, the extra calibration signal peaks should be located at frequencies that best discriminates between the printing and scanning process, normal scuffing and a web camera reader. These locations can be determined by analyzing the frequency response of printing, scanning, scuffing and web cameras for frequency differences.

For example, a printing-scanning process may represent high-frequencies better than a camera, but not low frequencies. In addition, scuffing may show low-and-high frequency losses. Thus, the reader will be able to determine if the watermark has been copied, involving an additional scanning-printing process, by the relative intensities of the extra and original calibration signal peaks at low and high frequencies. In this example, high-and-low frequency loss is acceptable, whereas only low frequency loss represents a copied watermark.

In addition, the extra calibration signal peaks could also be dependent upon the content of the host signal, thus providing additional defense against the copy attack. For example, the host image samples could be broken in 16 equal sub-blocks, and the location of the extra peaks depends upon the average intensity of each quadrant to the total average intensity. Or, if only a section of the image is visible to the reader, each 32 by 32 sample block could be used in the above calculation instead of the complete image. Any "hash" of the host image that survives a web camera reader (referred to as a perceptual hash) could be used. To this end, if the watermark is moved to another picture, after it is read, it is less likely that the extra calibration signal peak locations are correct, not to mention that the less intense calibration signal points have been removed by the additional scanning-printing process.

Alternatively, in regards to the copy attack, the content dependent information could be used to slightly move the location of a few original calibration signal peaks, as opposed to adding extra calibration signal peaks. This means that the image content is implicitly in the calibration signal's jitter, and the copy attack is less likely to succeed unless the read and embedded images have the same perceptual hash. On the one hand, this approach may reduce robustness of the robust message to scaling, rotation and translation. On the other hand, no extra bits containing the output of the perceptual hash need to be embedded in the robust message.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the embedding processes may be implemented in a programmable computer or a special purpose digital circuit. Similarly, detecting processes may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of modifying a media signal so that the media signal is authenticated by detecting an alteration to the media signal, the method comprising:
    transforming at least a portion of the media signal into a set of frequency coefficients in a frequency domain;
    adjusting a relationship between selected frequency coefficients to a reference value such that the alteration to the media signal to be detected alters the relationship, including computing the relationship as a function of relative magnitude of the selected frequency coefficients, the relative magnitude between the selected coefficients being adjusted to the reference value, the alteration being detected by computing the relationship and comparing the computed relationship with the reference value to determine whether a change in the relative magnitudes has occurred indicating that the alteration has occurred.

2. The method of claim 1 wherein the media signal is an image signal.

3. The method of claim 2 wherein the alteration to be detected is scanning, printing or photocopying the image signal.

4. The method of claim 1 wherein the relationship comprises a ratio between a selected coefficient and one or more neighboring coefficients.

5. The method of claim 4 wherein the relationship comprises a ratio between the magnitude of a selected coefficient and an average of neighboring coefficients.

6. The method of claim 1 including:
    embedding a calibration signal into the media signal to enable a detector to compensate for changes in scale or translation of the media signal after being adjusted according to the relationship.

7. A computer readable medium on which is stored software for performing a method of modifying a media signal so that the media signal is authenticated by detecting an alteration to the media signal, the method, comprising:
    transforming at least a portion of the media signal into a set of frequency coefficients in a frequency domain;
    adjusting a relationship between selected frequency coefficients to a reference value such that the alteration to the media signal to be detected alters the relationship, including computing the relationship as a function of relative magnitude of the selected frequency coefficients, the relative magnitude between the selected coefficients being adjusted to the reference value, the alteration being detected by computing the relationship and comparing the computed relationship with the reference value to determine whether a change in the relative magnitudes has occurred indicating that the alteration has occurred.

8. A detector for authenticating a media signal that has been processed by and adjusting a relationship between selected frequency coefficients of the media signal to a reference value such that the alteration to the media signal to be detected alters the relationship, including computing the relationship as a function of relative magnitude of the selected frequency coefficients, the relative magnitude between the selected coefficients being adjusted to the reference value, the detector comprising:
    memory for storing the media signal; and
    a processor for detecting the alteration by computing the relationship and comparing the computed relationship with the reference value to determine whether a change in the relative magnitudes has occurred indicating that the alteration has occurred.

9. The detector of claim 8 including means for computing the relationship in a potentially corrupted version of the media signal and comparing the computed relationship from the potentially corrupted version with a threshold to detect alteration of the potentially corrupted media signal.

10. A method of authenticating a media signal comprising:
    evaluating signal peaks at selected frequency locations of the media signal, where the media signal has been previously modified to include peaks at the selected locations, at least some of the peaks being set such that the relative magnitudes of the peak at a selected location satisfies a predetermined relationship with magnitude at one or more other frequency locations; and
    determining based on degradation of the signal peaks whether the media signal has been altered, including evaluating magnitude of at least some of the peaks relative to the magnitude at the one or more other frequency locations to detect a change in the predetermined relationship, the change indicating that the media signal has been altered.

11. The method of claim 10 including using one or more of the peaks to re-orient the media signal.

12. The method of claim 10 including:
    correlating the media signal with a calibration signal having an arrangement of peaks at selected frequency locations to determine translation and scale of the media signal.

13. The method of claim 12 including:
   correlating the media signal with the calibration signal to determine rotation of the media signal.

14. The method of claim 10 wherein the media signal is an image.

15. The method of claim 10 wherein the media signal is an audio signal.

16. The method of claim 10 wherein the media signal is a video signal.

17. A computer readable medium having software for performing a method of authenticating a media signal comprising:
   evaluating signal peaks at selected frequency locations of the media signal, where the media signal has been previously modified to include peaks at the selected locations, at least some of the peaks being set such that the relative magnitudes of the peak at a selected location satisfies a predetermined relationship with magnitude at one or more other frequency locations; and
   determining based on degradation of the signal peaks whether the media signal has been altered, including evaluating magnitude of at least some of the peaks relative to the magnitude at the one or more other frequency locations to detect a change in the predetermined relationship, the change indicating that the media signal has been altered.

18. A watermark decoder comprising:
   a memory for storing a media signal suspected of carrying a watermark;
   a detector in communication with the memory for correlating a calibration signal with the media signal to determine orientation parameters describing orientation of the media signal at embedding of the watermark, where the calibration signal includes a set of peaks at selected frequency locations, at least some of the peaks being set such that the relative magnitudes of the peak at a selected location satisfies a predetermined relationship with magnitude at one or more other frequency locations; and
   an analyzer in communication with the memory operable to orient the media signal using the orientation parameters and to evaluate whether the media signal has been altered after the embedding by examining signal peaks at selected frequency coefficients in the media signal, the analyzer being operable to evaluate magnitude of at least some of the peaks relative to the magnitude at the one or more other frequency locations to detect a change in the predetermined relationship, the change indicating that the media signal has been altered.

19. The decoder of claim 18 wherein the detector and analyzer use at least some of the same frequency locations for determining orientation and evaluating whether the media signal has been altered.

20. The decoder of claim 18 wherein the analyzer is used to detect reproduction of a printed image by examining degradation of the media signal at selected frequency locations.

* * * * *